(12) United States Patent
Liu et al.

(10) Patent No.: US 11,931,671 B2
(45) Date of Patent: Mar. 19, 2024

(54) THREE-STAGE TUBULAR T-SHAPED DEGASSING DEVICE WITH MICROBUBBLE AXIAL FLOW AND SPIRAL FLOW FIELDS

(71) Applicant: Qingdao University of Technology, Qingdao (CN)

(72) Inventors: Xinfu Liu, Qindao (CN); Zhongxian Hao, Qingdao (CN); Ji Chen, Qingdao (CN); Chaoyong Yu, Qingdao (CN); Guanghai Yu, Qingdao (CN); Aigang Hao, Qingdao (CN); Xiaoming Wu, Qingdao (CN); Jianfeng Wang, Qingdao (CN); Wen Xing, Qingdao (CN); Yongjun Shi, Qingdao (CN); Xiaolei Wang, Qingdao (CN); Ruiqiang Zhang, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 317 days.

(21) Appl. No.: 17/498,004

(22) Filed: Oct. 11, 2021

(65) Prior Publication Data
US 2022/0219100 A1     Jul. 14, 2022

(30) Foreign Application Priority Data
Jan. 13, 2021   (CN) .......................... 202110040894.7

(51) Int. Cl.
*B01D 19/00*     (2006.01)
(52) U.S. Cl.
CPC ..... *B01D 19/0047* (2013.01); *B01D 19/0057* (2013.01); *B01D 19/0068* (2013.01)
(58) Field of Classification Search
CPC . B01D 19/00; B01D 19/0068; B01D 19/0057
See application file for complete search history.

(56) References Cited

U.S. PATENT DOCUMENTS

| | | | |
|---|---|---|---|
| 2,670,056 A * | 2/1954 | Rossiter .................... | B04C 7/00 55/346 |
| 3,641,745 A * | 2/1972 | Moore ...................... | B04C 3/06 55/345 |

(Continued)

FOREIGN PATENT DOCUMENTS

| CN | 104801071 A | 7/2015 |
|---|---|---|
| CN | 106334635 A | 1/2017 |

(Continued)

OTHER PUBLICATIONS

Combined Search and Examination Report under Sections 17 and 18(3), GB application No. GB2115643.5, dated Apr. 19, 2022.

*Primary Examiner* — Youngsul Jeong

(57) ABSTRACT

A three-stage tubular T-shaped degassing device with microbubble axial flow and spiral flow fields is provided, which is applied to quick degassing of a gas-liquid two-phase flow. The three-stage tubular T-shaped degassing device adopts a quick degassing technology combining a microbubble uniform mixed rotational axial flow field and a spiral runner conical spiral flow field with layered jet collision reversing depth degassing. A microbubble uniform mixer is configured to adjust gas-liquid two-phase flow containing big bubbles into microbubble uniform mixed axial flow. A microbubble cyclone is configured to adjust the microbubble uniform mixed axial flow into multiple strands of rotational axial flows containing microbubbles. A rotational axial flow degasser implements the horizontal type microbubble uniform mixed multiple strands rotational axial flow degassing operation to remove most microbubbles to form axial flow gas and axial flow liquid.

10 Claims, 13 Drawing Sheets

(56) References Cited

U.S. PATENT DOCUMENTS

| | | | |
|---|---|---|---|
| 7,401,599 B2* | 7/2008 | Saito | B04C 5/185 |
| | | | 123/518 |
| 2006/0162561 A1* | 7/2006 | Oglesby | B01D 21/34 |
| | | | 95/253 |
| 2009/0120854 A1* | 5/2009 | Parikh | F01M 13/022 |
| | | | 210/141 |

FOREIGN PATENT DOCUMENTS

| | | |
|---|---|---|
| CN | 112302614 A | 2/2021 |
| CN | 112546678 A | 3/2021 |

\* cited by examiner

THREE-STAGE TUBULAR T-SHAPED DEGASSING DEVICE WITH MICROBUBBLE AXIAL FLOW AND SPIRAL FLOW FIELDS

CROSS REFERENCE TO RELATED APPLICATION

This patent application claims the benefit and priority of Chinese Patent Application No. 202110040894.7 entitled "Three-stage Tubular Type T-shaped Degassing Device with Microbubble Axial Flow and Spiral Flow Fields" filed on Jan. 13, 2021, the disclosure of which is incorporated by reference herein in its entirety as part of the present application.

TECHNICAL FIELD

The present disclosure relates to a tubular quick degassing device in the field of oil-gas field development and exploitation projects, in particular to a double-field three-stage tubular T-shaped degassing device combining a microbubble uniform mixed rotational axial flow field with a spiral runner conical spiral flow field, and an operation procedure of the same.

BACKGROUND ART

An efficient separation technology for gas-liquid two-phase flow has a very important practical significance for oil-gas field development and exploitation projects. The main reasons are that: firstly, an efficient degassing technology can effectively prevent slug flow in a mixed transportation process of a gas phase, a liquid phase, and avoid the slug flow from impacting a transportation pipeline and equipment along the transportation pipeline; and secondly, the efficient degassing technology can effectively reduce a bottom back pressure during the oil-gas field exploitation, thereby improving the oil and gas recovery rate.

In a conventional gas-liquid separation technology, a container-type separator or a container-type condensate trap is used. The container-type separator performs gravity separation by mainly relying on a density difference between the gas-liquid and the liquid phase. The retention time during separation is relatively long, equipment is relatively large in volume, and a relatively large area is occupied. Furthermore, the separation efficiency is relatively low, which cannot meet the current high requirement for oil-gas separation efficiency.

Fliance et al. have designed a gas-liquid separation hydrocyclone with a spiral wall surface. Compared with a traditional volumetric separator, the gas-liquid separation hydrocyclone has advantages of simple and compact structure, lower energy consumption, small equipment volume, light weight, easy operation and the like. Furthermore, in considerations of environment and safety, a residual amount of hydrocarbons can be obviously reduced. Among them, a hydrocyclone for oil and gas separation developed by British Petroleum Company has extremely high degassing efficiency, which is much higher than that of conventional gravity separators. Crude oil with a gas volume content of 64% is separated once by the hydrocyclone, so that the gas volume content can be reduced to 5%, and an oil content in the discharged gas is low.

Movafaghian et al. have carried out research work on a geometric structure, material characteristics, and a pressure factor of a gas-liquid columnar separator. The gas-liquid columnar separator (GLCC) belongs to a spiral flow type gas-liquid separator, and research and application of which are the most mature. A working mechanism of the spiral flow type gas-liquid columnar separator is gas-liquid separation mainly through flow pattern conversion at an inlet and spiral flow in a barrel body. Applicable working conditions of such separator is gas-liquid two-phase flow with low velocity and low gas-liquid ratio and with a gas phase as a continuous phase. However, when the separator is applied to mist flow and slug flow with high gas-liquid ratio and high gas velocity, the liquid phase is in a form of high-speed rotating liquid droplets or liquid films which climb along a wall surface of the separator, and finally spin out of a gas pipe, which causes reduction of separation performance. Finally, it should be noted that the current domestic research on compact and efficient gas-liquid separation technology is still in an experimental stage.

SUMMARY

In order to overcome the defects and the shortcomings of container types, columnar and hydrocyclone gas-liquid separation treatment facilities, and improve the existing research situation of a domestic compact efficient gas-liquid separation technology, which is still in an experimental stage, the present disclosure aims to provide a three-stage tubular type T-shaped degassing device with microbubble axial flow and spiral flow fields, which is suitable for gas-liquid two-phase quick degassing in the field of oil-gas field development and exploitation projects. The three-stage tubular T-shaped degassing device adopts a quick degassing technology combining a microbubble uniform mixed rotational axial flow field and a spiral runner conical spiral flow field with layered jet collision reversing depth degassing to sequentially implement a horizontal type microbubble uniform mixing multiple strands rotational axial flow degassing operation, a vertical type spiral runner single strand conical spiral flow degassing operation, and a vertical type layered jet collision reversing degassing operation, has advantages of quick degassing, low liquid content of gas, small occupied area of equipment, light weight, and the like, and effectively solves the problem of quick degassing of the gas-liquid two-phase flow.

The technical solution used to solve the technical problem of the present disclosure is to develop a three-stage tubular T-shaped degassing device with microbubble axial flow and spiral flow fields, which includes a microbubble uniform mixer, a microbubble rotator, a rotational axial flow degasser, a conical spiral flow degasser, and a jet reversing degasser. Materials of the rotational axial flow degasser, the conical spiral flow degasser, and the jet reversing degasser adopt super duplex stainless steel and lining materials of the rotational axial flow degasser, the conical spiral flow degasser, and the jet reversing degasser adopt cermet. The microbubble uniform mixer, the microbubble rotator, and the rotational axial flow degasser are coaxially disposed in sequence from left to right and are connected by flanges. The jet reversing degasser and the conical spiral flow degasser are coaxially disposed from top to bottom. The rotational axial flow degasser, the conical spiral flow degasser, and the jet reversing degasser are connected with an axial flow drainage three-way pipe into an assembly by flange plates at end parts of three pipe sections of the axial flow drainage three-way pipe. And the rotational axial flow degasser is perpendicularly intersected with the conical spiral flow degasser and the jet reversing degasser, so that the three-stage tubular T-shaped degassing device as a whole is of a T-shaped tubular configuration.

The microbubble uniform mixer is configured to adjust gas-liquid two-phase flow containing big bubbles into microbubble uniform mixed axial flow by microbubble generation circular plates arrayed hierarchically and variable-diameter micropores in the circular plates, and includes a uniform mixing pipe body and the microbubble generation circular plates.

The uniform mixing pipe body adopts a combined pipe body formed of a variable-section column pipe and a conical pipe. The flange plates are provided at two ends of the uniform mixing pipe body. The uniform mixing pipe body includes a columnar uniform mixing pipe section and a conical gathering and transporting pipe section. An inner pipe wall of the columnar uniform mixing pipe section is configured with variable-diameter revolution surfaces. A shaft shoulder is formed at a junction of adjacent variable-diameter revolution surfaces of the columnar uniform mixing pipe section to realize an axial positioning of the microbubble generation circular plates. An inner pipe wall and an outer pipe wall of the conical gathering and transporting pipe section of the uniform mixing pipe body is configured with conical surfaces with the same tapers. And a diameter of a first small end circular surface of a conical surface where an inner pipe wall of the conical gathering and transporting pipe section of the uniform mixing pipe body is located is equal to an inner diameter of the swirling pipe body, an inner diameter of the axial flow column pipe body, and an inner diameter of the axial flow horizontal drainage pipe. After the microbubble uniform mixed axial flow is momentarily buffered in a lumen of the columnar uniform mixing pipe section, the microbubble uniform mixed axial flow is subjected to continuous pressure adjustment by the conical gathering and transporting pipe section and is gathered and transported to the swirling pipe body.

The microbubble generation circular plates adopt super duplex stainless steel plates with a same thickness. The microbubble generation circular plates are coaxially arranged hierarchically at equal intervals in an axial direction of the uniform mixing pipe body. Outer ring surfaces of the microbubble generation circular plates are in an interference fit with a cylindrical surface where the variable-diameter revolution surfaces of the columnar uniform mixing pipe section are located, so that the microbubble generation circular plates are fixed in a lumen of the uniform mixing pipe body in an interference fit. The microbubble generation circular plates are provided with variable-diameter micropores in radial directions of the microbubble generation circular plates. The variable-diameter micropores in one plate of the microbubble generation circular plates and the variable-diameter micropores in another plate of the microbubble generation circular plates adjacent to the one plate are arranged in a staggered manner. The variable-diameter micropores of each microbubble generation circular plate are uniformly distributed in a circumferential direction of the microbubble generation circular plate. Each of the variable-diameter micropores includes a left conical runner, a right conical runner, and one columnar runner in the axial direction of the uniform mixing pipe body. And a cone height of a conical surface where a left conical runner of the variable-diameter micropore is located is greater than a cone height of a conical surface where a right conical runner is located.

The microbubble cyclone is configured to adjust the microbubble uniform mixed axial flow into multiple strands of rotational axial flows containing microbubbles by microbubble spiral gears which are arranged in a squirrel cage, and includes the swirling pipe body, the microbubble spiral gears, and a swirling imitated cone body.

The swirling pipe body adopts a horizontal type equal-diameter short pipe, and is provided with flange plates at two ends of the swirling pipe body. The uniform mixing pipe body and an axial flow column pipe body are connected with the swirling pipe body into an assembly through flange connection.

The swirling imitated cone body and the swirling pipe body are coaxially disposed, and the swirling imitated cone body includes an ellipsoidal flow leading body, a columnar gear body and a conical flow guiding body. The ellipsoidal flow leading body of the swirling imitated cone body is configured with a hemi-ellipsoidal surface, and is configured to smoothly lead the microbubble uniform mixed axial flow to spiral gear slots. The columnar gear body is configured with a cylindrical surface and is uniformly welded with the microbubble spiral gears in a circumferential direction of the columnar gear body. The conical flow guiding body is configured with a conical surface and is configured to smoothly guide the multiple strands of rotational axial flows to the lumen of the axial flow column pipe body.

The microbubble spiral gear includes microbubble spiral teeth which are uniformly arranged in a squirrel cage around the columnar gear body of the swirling imitated cone body. Tooth traces of the microbubble spiral teeth are spiral lines spread along a cylindrical surface where the columnar gear body is located. Screw pitches of spiral lines where the tooth traces of the microbubble spiral teeth are located, gradually increase along an axial direction of the swirling imitated cone body. Cross-sections of the microbubble spiral teeth perpendicular to the tooth traces of the microbubble spiral teeth is a trapezoid. Tangent lines at start points of the tooth traces of the microbubble spiral teeth is parallel to an axial line of the swirling imitated cone body. Tangent lines at end points of the tooth traces are obliquely interlaced with the axial line of the swirling imitated cone body. Outer tooth surfaces of the microbubble spiral gears in a radial direction of the swirling imitated cone body are configured as a cylindrical surface. A cylindrical surface where the outer tooth surfaces of the microbubble spiral gears are located is in an interference fit with an inner pipe wall of the swirling pipe body. Therefore, the microbubble spiral gear is fixed to a lumen of the swirling pipe body in an interference fit, and a spiral gear slot is formed between two adjacent microbubble spiral teeth. The spiral gear slots between the microbubble spiral teeth are configured as runners for speeding up and changing a direction of the microbubble uniform mixed axial flow. And areas of cross-sections of the spiral gear slots perpendicular to the tooth traces of the microbubble spiral teeth continuously decrease in the axial direction of the swirling imitated cone body.

The rotational axial flow degasser implements the horizontal type microbubble uniform mixed multiple strands rotational axial flow degassing operation to remove most microbubbles carried in the gas-liquid two-phase flow to form axial flow gas and axial flow liquid, and is configured to adjust the axial flow liquid in a horizontal rotational state into a horizontal constant-speed axial flow by a rotational axial flow impeller. The rotational axial flow degasser includes the axial flow column pipe body, the rotational axial flow impeller, the axial flow drainage three-way pipe, and an axial flow exhaust pipe.

The axial flow column pipe body adopts a horizontal type equal-diameter thick long pipe, in which a microbubble uniform mixed rotational axial flow field is formed. Two ends of the axial flow column pipe body are provided with flange plates. The axial flow exhaust pipe adopts a horizontal type equal-diameter thin long pipe and is configured as a gathering and discharging runner for the axial flow gas. A sealing outer pipe thread is turned on a right side end of the axial flow exhaust pipe, and an axial flow conical groove is milled in a left side end of the axial flow exhaust pipe, thereby smoothly guiding the axial flow liquid to the rotational axial flow impeller. The axial flow drainage three-way pipe adopts a three-way type thick pipe, and includes three connected pipe sections, namely, the axial flow horizontal drainage pipe, an axial flow upper vertical drainage pipe and an axial flow lower vertical drainage pipe. The end parts of the three pipe sections of the axial flow drainage three-way pipe are respectively provided with flange plates. The axial flow column pipe body, a spiral flow taper pipe body and a reversing buffer column pipe body are connected with the axial flow drainage three-way pipe into an assembly through flange connection. The axial flow upper vertical drainage pipe and the axial flow lower vertical drainage pipe have equal inner diameters and are vertically intersected with the axial flow horizontal drainage pipe. And the axial flow horizontal drainage pipe and the axial flow exhaust pipe are coaxially disposed to constitute a horizontal double-lumen drainage runner. The axial flow upper vertical drainage pipe and the gas flow gathering pipe are coaxially disposed to constitute an upper vertical double-lumen buffer runner. And the axial flow lower vertical drainage pipe and the spiral flow exhaust pipe are coaxially disposed to constitute a lower vertical double-lumen drainage runner.

The rotational axial flow impeller includes rotational axial flow blades uniformly arranged around an outer ring surface of the axial flow exhaust pipe. Blade surfaces of rotational axial flow blades each adopt a combined surface formed of a plane and a curved surface. A left side and a right side of the blade surfaces of the rotational axial flow blades are planes. Planes where the left side surfaces and the right side surfaces of the blade surfaces of the rotational axial flow blades are located are kept parallel to the axis of the axial flow exhaust pipe. An inner side of the rotational axial flow impeller in a radial direction of the axial flow column pipe body is fixed on the axial flow exhaust pipe through circumferential welding. And an outer side of the axial flow column pipe body is embedded into a right lumen of the axial flow column pipe body in an interference fit. Rotational axial flow blade slots are formed between the rotational axial flow blades and are configured as runners for adjusting a flowing direction of the axial flow liquid.

A process of the horizontal type microbubble uniform mixed multiple strands rotational axial flow degassing operation is as follows. The gas-liquid two-phase flow enters the uniform mixing pipe body, flows through the microbubble generation circular plates arranged hierarchically, and is adjusted into the microbubble uniform mixed axial flow; then, the microbubble uniform mixed axial flow flows through the swirling imitated cone body and is led to the microbubble spiral gears arranged in a squirrel cage; the microbubble uniform mixed axial flow in the spiral gear slots is continuously sped up and reversed, and is adjusted into a multiple strands rotational axial flow; next, the microbubble uniform mixed axial flow is slantways cut into the lumen of the axial flow column pipe body to the right; the microbubble uniform mixed axial flow in the microbubble uniform mixed rotational axial flow field continuously quickly rotates along the horizontal direction; the axial flow liquid enters the rotational axial flow impeller via the axial flow conical groove and is adjusted into a horizontal constant-speed axial flow through the rotational axial flow blade slots; and finally, the axial flow liquid flows through the horizontal double-lumen drainage runner of the axial flow drainage three-way pipe and is buffered by the upper vertical double-lumen buffer runner and is drained through the lower vertical double-lumen drainage runner. Meanwhile, most microbubbles are gradually transported to a center part of the axial flow column pipe body and are stretched to be broke and gathered into thin long columnar axial flow gas; and the axial flow gas is continuously gathered via the axial flow exhaust pipe and then is discharged.

The conical spiral flow degasser implements the vertical type spiral runner and single-strand conical spiral flow degassing operation to remove a few of remaining microbubbles carried in the axial flow liquid to form spiral flow gas and spiral flow liquid. The spiral flow liquid in a vertical rotational state is adjusted to be a vertical uniform flow by the spiral flow impeller. The conical spiral flow degasser includes a spiral flow cone pipe body, a spiral flow liquid inlet circular plate, a spiral flow drainage pipe, a spiral flow gas gathering pipe, a spiral flow exhaust pipe and a spiral flow impeller.

The spiral flow cone pipe body adopts a vertical type variable-diameter thick-wall thick pipe, arch-shaped liquid supply slots are milled in an upper end of the spiral flow cone pipe body and are uniformly distributed in a circumferential direction of the spiral flow cone pipe body. An inner slot surface and an outer slot surface of each arch-shaped liquid supply slot in a radial direction of the spiral flow cone pipe body adopt circular arch surfaces with different diameters, and slot surfaces at two sides of the arch-shaped liquid supply slot in a circumferential direction of the spiral flow cone pipe body adopt semi-cylindrical surfaces. A diameter of the circular arch surface, where the outer slot surface of the arch-shaped liquid supply slot in the radial direction of the spiral flow cone pipe body is located, is equal to an inner diameter of the axial flow upper vertical drainage pipe, an inner diameter of the axial flow lower vertical drainage pipe, and an inner diameter of the reversing buffer column pipe body. The inner pipe wall of the spiral flow cone pipe body is milled with a spiral runner, a conical spiral flow runner and a columnar spiral flow runner in sequence from top to bottom. Axial heights of the spiral runner, the conical spiral flow runner and the columnar spiral flow runner in the spiral flow cone pipe body decrease in sequence, and a spiral runner conical spiral flow field is formed inside. A center line connecting center points of all cross-sections of the spiral runner adopts a variable-pitch spiral line. The cross-sections of the spiral runner perpendicular to the center line are semicircular surfaces, and areas of circular surfaces where the cross-sections perpendicular to the center line of the spiral runner are located, gradually increase from top to bottom, and distances from the center points of the circular surfaces where the cross-sections are located to an axis of the spiral flow cone pipe body continuously decreases from top to bottom, so that the whole spiral runner is inversely conical. A runner located at a top end of the spiral runner is kept in communication with the arch-shaped liquid supply slots, and the spiral runner located at a bottom end is combined with the conical spiral flow runner. A diameter of a second small end circular surface of a conical surface where the pipeline wall of the conical spiral flow runner is located is equal to a diameter of a cylindrical surface where the pipeline wall of the columnar spiral flow runner is located.

The spiral flow liquid inlet circular plate adopts a circular steel plate, and arc-shaped liquid transportation slots are milled in a plate body of the spiral flow liquid inlet circular plate. The arch-shaped liquid transportation slots realize communication between the arch-shaped liquid supply slots of the spiral flow cone pipe body and the axial flow drainage three-way pipe. Cross-sections of the arch-shaped liquid transportation slots and the arc-shaped liquid supply slots are kept consistent in shape and size. A lower tubular boss is provided in a center part of the spiral flow liquid inlet circular plate, and sealing inner pipe threads are turned at upper and lower ends of the lower tubular boss. Therefore, the spiral flow liquid inlet circular plate connects the spiral flow gas gathering pipe and the spiral flow exhaust pipe into an assembly through threaded connection.

The spiral flow drainage pipe adopts a vertical type equal-diameter thick short pipe. Two ends of the spiral flow drainage pipe are provided with flange plates, and the spiral flow drainage pipe is fixed at a bottom of the spiral flow cone pipe body. The spiral flow gas gathering pipe and the spiral flow exhaust pipe respectively adopt a vertical type equal-diameter thin short pipe and a thin long pipe. A lower end of the spiral flow gas gathering pipe is milled with a spiral flow conical groove, and the upper end is turned with a sealing outer pipe thread. Two ends of the spiral flow exhaust pipe are turned with sealing outer pipe threads. The spiral flow gas gathering pipe, the spiral flow exhaust pipe, the gas flow gathering pipe, and the gas flow transportation pipe are coaxially arranged in sequence from bottom to top and have a same inner diameter.

The spiral flow impeller is embedded into a lower part of the lumen of the spiral flow drainage pipe, and is formed by welding a spiral flow guiding cover, a spiral flow rod and spiral flow blades in sequence. The spiral flow guiding cover adopts a center-closed conical shell and is configured to guide the spiral flow liquid that rotates at a high speed into each of the spiral flow blades which adopts a flat-plate blade, and is uniformly disposed around an outer ring surface of the spiral flow rod. An inner side of each of the spiral flow blade in a radial direction of the spiral flow rod is fixed to the spiral flow rod through circumferential welding, and an outer side of each of the spiral flow blades is fixed to an inner pipe wall of the spiral flow drainage pipe in an interference fit.

A process of the vertical type spiral runner and single strand conical spiral flow degassing operation is: the axial flow liquid flows into the spiral runner conical spiral flow field via the axial flow drainage three-way pipe through the arch-shaped liquid transportation slot and the arch-shaped liquid supply slot; the runner section of the spiral runner continuously shrinks so that the axial flow liquid rotates at high speed to form single-strand conical spiral flow and then enters the conical spiral flow runner, and an angular momentum increases quickly; the rotating speed of the single-strand conical spiral flow is further increased, and the single-strand conical spiral flow stays in the columnar spiral flow runner for a moment; in the high-speed downward rotating process, the liquid-phase fluid is gradually thrown to the pipe wall to form the spiral flow liquid; the spiral flow liquid is guided into the spiral flow impeller via the spiral flow guiding cover and is adjusted into a vertical uniform flow by the spiral flow blades; finally, the spiral flow liquid is discharged by the spiral flow drainage pipe; meanwhile, a few of remaining microbubbles are gradually transported to the center part of the spiral flow cone pipe body and are reversely raised and gathered into the spiral flow gas; and the spiral flow gas is caught and continuously gathered by the spiral flow gas gathering pipe and is discharged by the spiral flow exhaust pipe.

The jet reversing degasser implements the vertical type layered jet collision reversing degassing operation to remove small-particle-size liquid droplets carried in the axial flow gas and the spiral flow gas to form reversing gas and reversing liquid, and a dynamic balance between a reversing gas flow pressure and a reversing liquid flow pressure is realized through the reversing buffer column pipe body. The jet reversing degasser includes a liquid flow separation disk, the reversing buffer column pipe body, the gas flow gathering pipe, the gas flow transportation pipe, a jet nozzle, a reversing drainage pipe, and a three-way pipe joint.

The liquid flow separation disk adopts a circular steel plate, and an upper tubular boss is provided at a center part of the liquid flow separation disk. Upper and lower ends of the upper tubular boss are turned with sealing inner pipe threads. Therefore, the liquid flow separation disk connects the gas flow gathering pipe with the gas flow transportation pipe into an assembly through threaded connection. The three-way pipe joint adopts a three-way pipe body, and inner pipe walls of three pipe sections of the three-way pipe joint are turned with sealing inner pipe threads, and the axial flow exhaust pipe, the gas flow gathering pipe, and the spiral flow exhaust pipe are connected into an assembly through threaded connection.

The reversing buffer column pipe body adopts a vertical type equal-diameter thick long pipe, and two ends of the reversing buffer column pipe body are provided with flange plates. A circular hole is drilled in a lower part of the pipe body of the reversing buffer column pipe body, and the reversing drainage pipe is fixed through circumferential welding. The reversing drainage pipe adopts an equal-diameter thin long pipe and is disposed horizontally. The reversing buffer column pipe body and the gas flow transportation pipe are coaxially disposed to constitute a vertical double-lumen reversing runner. A sum of a pressure of the reversing gas above the lumen of the reversing buffer column pipe body and a liquid column pressure of the reversing liquid in the vertical double-lumen reversing runner is equal to a flowing pressure of the reversing liquid in the reversing drainage pipe.

The gas flow gathering pipe and the gas flow transportation pipe respectively adopt a vertical type equal-diameter thin short pipe and a thin long pipe. Two ends of the gas flow gathering pipe are turned with sealing outer pipe threads, and the axial flow gas and the spiral flow gas are gathered into one strand of mixed gas flow. A lower end of the gas flow transportation pipe is turned with sealing outer pipe thread, and an upper part of the gas flow transportation pipe is provided with jet nozzles arranged hierarchically in the axial direction of the gas flow transportation pipe. Jet nozzles in each layer are horizontally disposed and are uniformly distributed in a circumferential direction of the gas flow transportation pipe. Each of the jet nozzles are fixed on a pipe body of the gas flow transportation pipe through circumferential welding. An outer wall of each of the jet nozzle adopts a cylindrical surface, and an inner wall of each of the jet nozzles is formed by combining a cylindrical surface and a conical surface. The cylindrical surfaces and the conical surfaces of the inner wall of each of the jet nozzles are disposed in a radial direction of the gas flow transportation pipe from inside to outside. Therefore, the mixed gas flow, formed by gathering the axial flow gas and the spiral flow gas, is divided into multiple strands mixed gas flow via the jet nozzles. And the runner areas of the multiple strands of mixed gas flows in the jet nozzles gradually increase, and flowing pressures of the multiple strands of mixed gas flows continuously decrease.

A process of the vertical type layered jet collision reversing degassing operation is as follows. The axial flow gas and the spiral flow gas are gathered by the gas flow gathering pipe into one strand of mixed gas flow which is transported to the jet nozzles through the gas flow transportation pipe; then, the mixed gas flow is divided by the jet nozzles to form multiple strands mixed gas flow; the runner areas in the jet nozzles gradually increase, and the flowing pressure continuously decreases; then, the multiple strands mixed gas flow are simultaneously jetted into the reversing buffer column pipe body, and after the reversing, the small-particle-size liquid droplets carried by the gas flow are removed to form reversing gas and reversing liquid; the separated reversing gas rises up along the inner pipe wall of the reversing buffer column pipe body and is discharged; the reversing liquid falls into the vertical double lumen reversing runner for further buffering and separation and is finally discharged via the reversing drainage pipe; and meanwhile, the reversing buffer column pipe body realizes the dynamic balance between the reversing gas flowing pressure and the reversing liquid flowing pressure.

The technical effects that can be achieved by the present disclosure are as follows. The three-stage tubular and T-shaped degassing device adopts the quick degassing technology combining the microbubble uniform mixed rotational axial flow field and the spiral runner conical spiral flow field with the layered jet collision reversing depth degassing, and has the advantages of quick degassing, low liquid content of gas, small occupied area of equipment, light weight, and the like. The microbubble uniform mixer adjusts the gas-liquid two-phase flow containing big bubbles into microbubble uniform mixed axial flow by the microbubble generation circular plates arrayed hierarchically and the variable-diameter micropores in the circular plates. The microbubble cyclone adjusts the microbubble uniform mixed axial flow into multiple strands rotational axial flow containing microbubbles by the microbubble spiral gears arranged in a squirrel cage. The rotational axial flow degasser implements the horizontal type microbubble uniform mixed multiple strands rotational axial flow degassing operation to remove most microbubbles carried in the gas-liquid two-phase flow to form the axial flow gas and the axial flow liquid, and adjusts the axial flow liquid in the horizontal rotational state into the horizontal constant speed axial flow by a rotational axial flow impeller. The conical spiral flow degasser implements the vertical type spiral runner and single strand conical spiral flow degassing operation to remove a few of remaining microbubbles carried in the axial flow liquid to form the spiral flow gas and the spiral flow liquid, and the spiral flow liquid in the vertical rotational state is adjusted to be a vertical uniform flow by the spiral flow impeller. The jet reversing degasser implements the vertical type layered jet collision reversing degassing operation to remove the small particle size liquid droplets carried in the axial flow gas and the spiral flow gas to form reversing gas and reversing liquid.

BRIEF DESCRIPTION OF THE DRAWINGS

The present disclosure is further described below in combination with accompanying drawings, but the present disclosure is not limited to the following embodiment.

Figure 1:
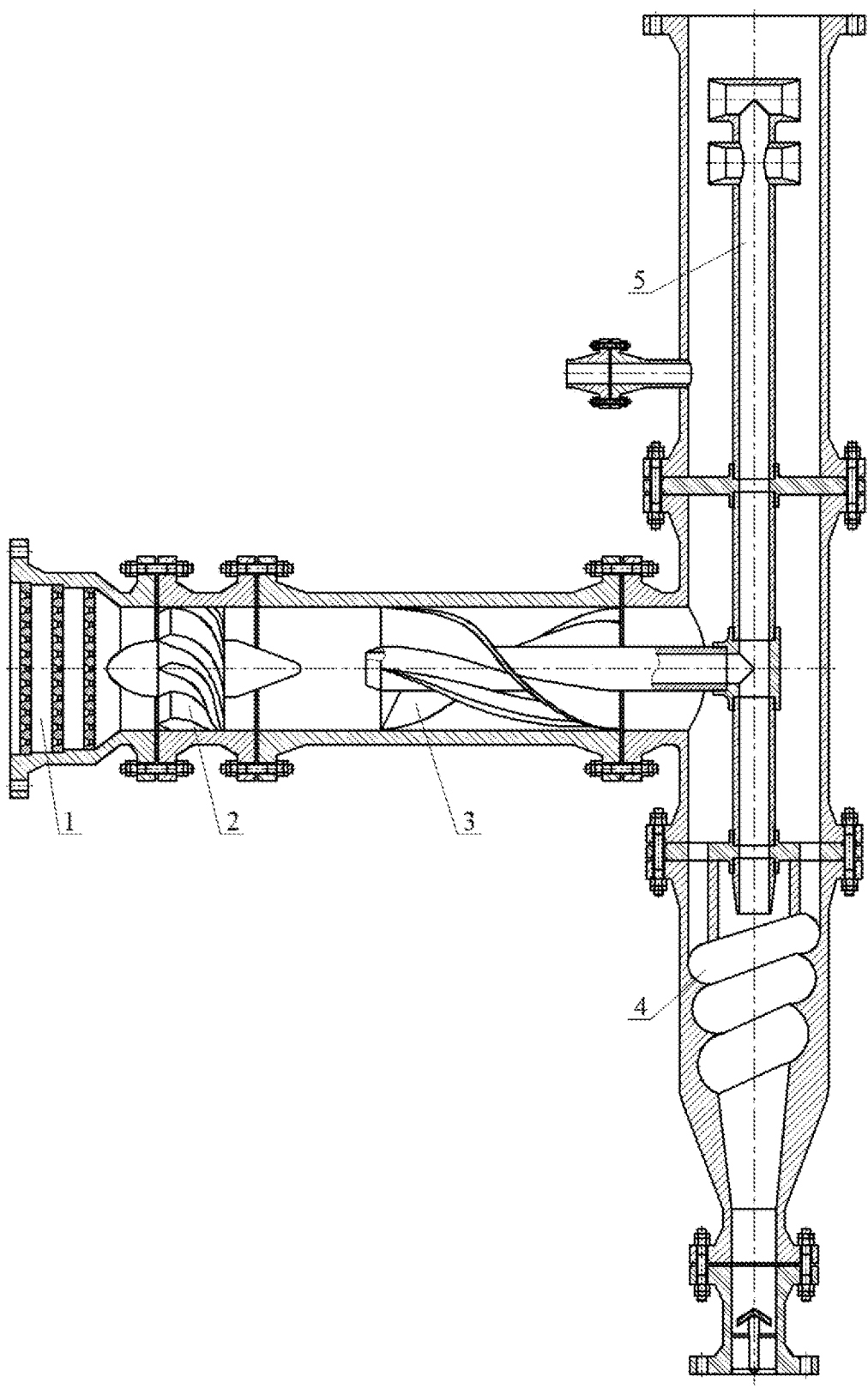
FIG. 1 is a schematic diagram of a typical structure of a three-stage tubular T-shaped degassing device with microbubble axial flow and spiral flow fields according to the present disclosure.

List of the reference characters: 1 microbubble uniform mixer; 2 microbubble cyclone; 3 rotational axial flow degasser; 4 conical spiral flow degasser; 5 jet reversing degasser; 6 microbubble generation circular plate; 7 uniform mixing pipe body; 8 conical gathering and transporting pipe section; 9 columnar uniform mixing pipe section; 10 variable-diameter micropore; 11 swirling pipe body; 12 swirling imitated cone body; 13 microbubble spiral gear; 14 ellipsoidal flow leading body; 15 columnar gear body; 16 conical flow guiding body; 17 spiral gear slot; 18 microbubble spiral teeth; 19 axial flow column pipe body; 20 rotational axial flow impeller; 21 axial flow exhaust pipe; 22 axial flow drainage three-way pipe; 23 axial flow upper vertical drainage pipe; 24 axial flow lower vertical drainage pipe; 25 axial flow horizontal drainage pipe; 26 axial flow conical groove; 27 rotational axial flow blade slot; 28 rotational axial flow blade; 29 spiral flow exhaust pipe; 30 spiral flow gas gathering pipe; 31 spiral flow liquid inlet circular plate; 32 spiral flow cone pipe body; 33 spiral flow drainage pipe; 34 spiral flow impeller; 35 arch-shaped liquid transportation slot; 36 lower tubular boss; 37 arch-shaped liquid supply slot; 38 spiral runner; 39 conical spiral flow runner; 40 columnar spiral flow runner; 41 spiral flow rod; 42 spiral flow blade; 43 spiral flow guiding cover; 44 jet nozzle; 45 reversing buffer column pipe body; 46 gas flow transportation pipe; 47 reversing drainage pipe; 48 liquid flow separation disk; 49 gas flow gathering pipe; 50 three-way pipe joint; 51 vertical double-lumen reversing runner; and 52 upper tubular boss.

DETAILED DESCRIPTION OF THE EMBODIMENTS

In FIG. 1, a three-stage tubular type T-shaped degassing device with microbubble axial flow and spiral flow fields includes a microbubble uniform mixer 1, a microbubble cyclone 2, a rotational axial flow degasser 3, a conical spiral flow degasser 4, and a jet reversing degasser 5, and adopts a quick degassing technology combining a microbubble uniform mixed rotational axial flow field and a spiral runner conical spiral flow field with layered jet collision reversing degassing to sequentially implement a horizontal type microbubble uniform mixed multiple strands rotational axial flow degassing operation, a vertical type spiral runner and single-strand conical spiral flow degassing operation, and a vertical type layered jet collision reversing degassing operation. A reversing buffer column pipe body of the jet reversing degasser 5 is connected to a gas transportation manifold by a flange plate, and the degassed reversing gas is pressurized and then transported to the outside. A spiral flow drainage pipe of the conical spiral flow degasser 4 and a reversing drainage pipe of the jet reversing degasser 5 are connected to a liquid transportation manifold by a flange plate, and the degassed spiral flow liquid and reversing liquid are respectively pressurized and then transported to the outside.

In FIG. 1, the microbubble uniform mixer 1, the microbubble cyclone 2 and the rotational axial flow degasser 3 are coaxially disposed in sequence from left to right and are connected by flanges. The jet reversing degasser 5 and the conical spiral flow degasser 4 are coaxially disposed from top to bottom. The rotational axial flow degasser 3, the conical spiral flow degasser 4, and the jet reversing degasser 5 are connected with an axial flow drainage three-way pipe into an assembly by flange plates at end parts of three pipe sections of the axial flow drainage three-way pipe of the rotational axial flow degasser 3. The rotational axial flow degasser 3 is perpendicularly intersected with the conical spiral flow degasser 4 and the jet reversing degasser 5, so that the whole three-stage tubular T-shaped degassing device is of a T-shaped tubular structure.

In FIG. 1, during debugging of the three-stage tubular T-shaped degassing device, an airtightness test and a hydraulic test are carried out at first. The pressure in the test process needs to reach 1.25 times of a designed pressure. Then, leakage and unblockage of joints of a pipeline system are checked; instrument gas sources are switched on, and check whether the instrument gas sources are clean and dry. During maintenance, it is checked whether there are foreign matter accumulation and rust inside an axial flow column pipe body and the axial flow drainage three-way pipe of the rotational axial flow degasser 3, the spiral flow cone pipe body of the conical spiral flow degasser 4, and the reversing buffer column pipe body of the jet reversing degasser 5; and whether a surface of the rotational axial flow impeller of the rotational axial flow degasser 3 and a surface of the spiral flow impeller of the conical spiral flow degasser 4 are rusted, wherein if a thickness of rust exceeds 2 mm, the impellers need to be replaced. Further, dirt on a microbubble spiral gear of the microbubble cyclone 2 and a spiral runner of the conical spiral flow degasser 4 is checked, wherein if the thickness of the dirt is greater than 3 mm, the gear and the runner need to be flushed. In addition, microbubble generation circular plates of the microbubble uniform mixer 1 and variable-diameter micropores in the circular plates need to be regularly cleaned.

Figure 2:
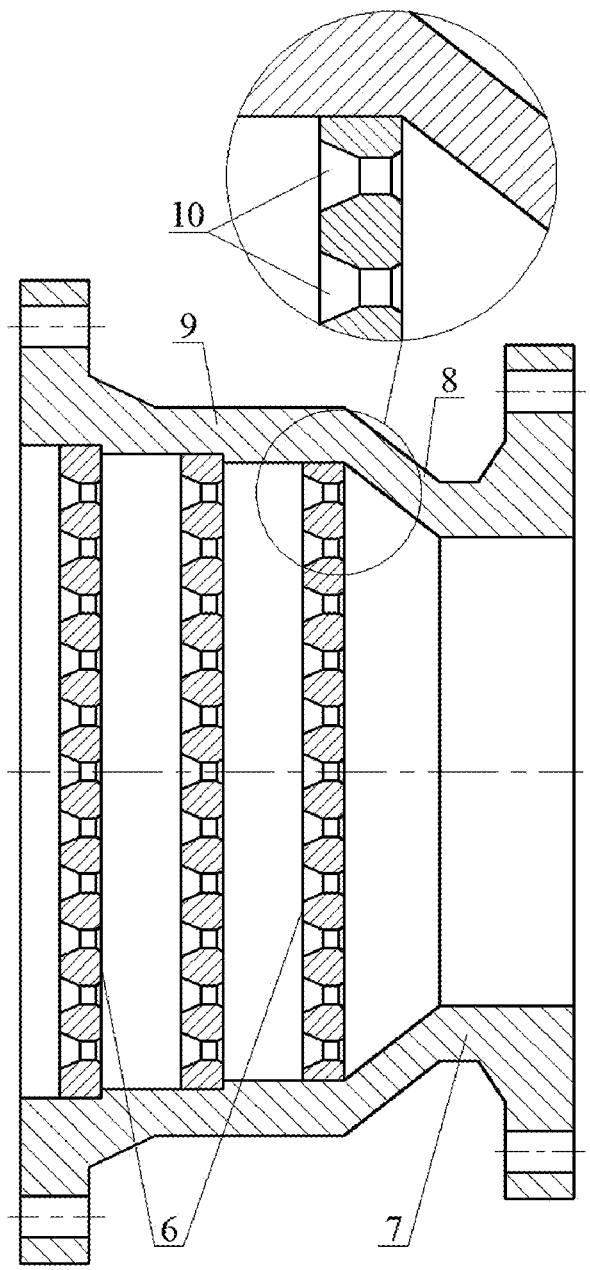
FIG. 2 is a schematic structural diagram of a microbubble uniform mixer in the three-stage tubular T-shaped degassing device with the microbubble axial flow and spiral flow fields.

In FIG. 2, the microbubble uniform mixer 1 adjusts a gas-liquid two-phase flow containing big bubbles into a microbubble uniform mixed axial flow by the microbubble generation circular plates 6 arranged hierarchically and the variable-diameter micropores 10 in the circular plates. A number of and a spacing among the microbubble generation circular plates 6 and a number and pore diameters of the variable-diameter micropores 10 need to be adjusted according to physical property parameters such as a flowing pressure, a flow velocity and viscosity. A volume of a uniform mixing pipe body 7 is designed according to a flow rate of the gas-liquid two-phase flow.

In FIG. 2, the uniform mixing pipe body 7 includes a conical gathering and transporting pipe section 8 and a columnar uniform mixing pipe section 9. The microbubble generation circular plates 6 are coaxially arranged hierarchically at equal intervals in an axial direction of the uniform mixing pipe body 7, are fixed in a lumen of the columnar uniform mixing pipe section 9 in an interference fit, and are provided with the variable-diameter micropores 10 in a radial direction of the microbubble generation circular plates 6.

Figure 3:
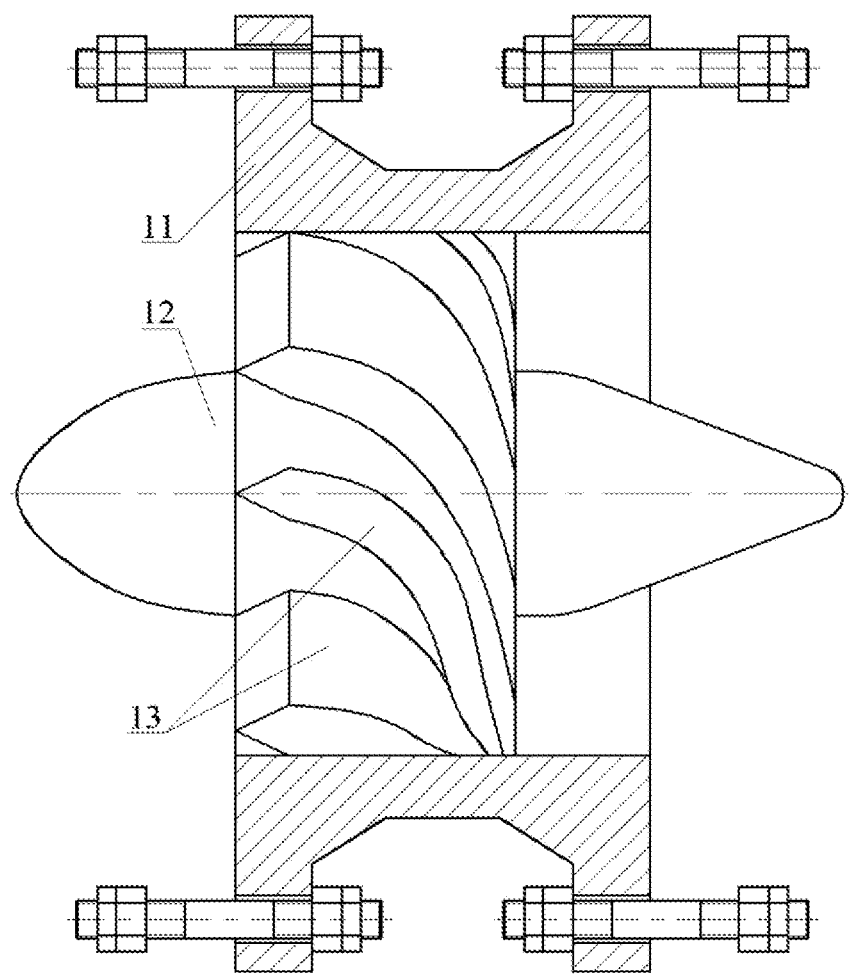
FIG. 3 is a schematic structural diagram of a microbubble cyclone in the three-stage tubular T-shaped degassing device with the microbubble axial flow and spiral flow fields.
Figure 4:
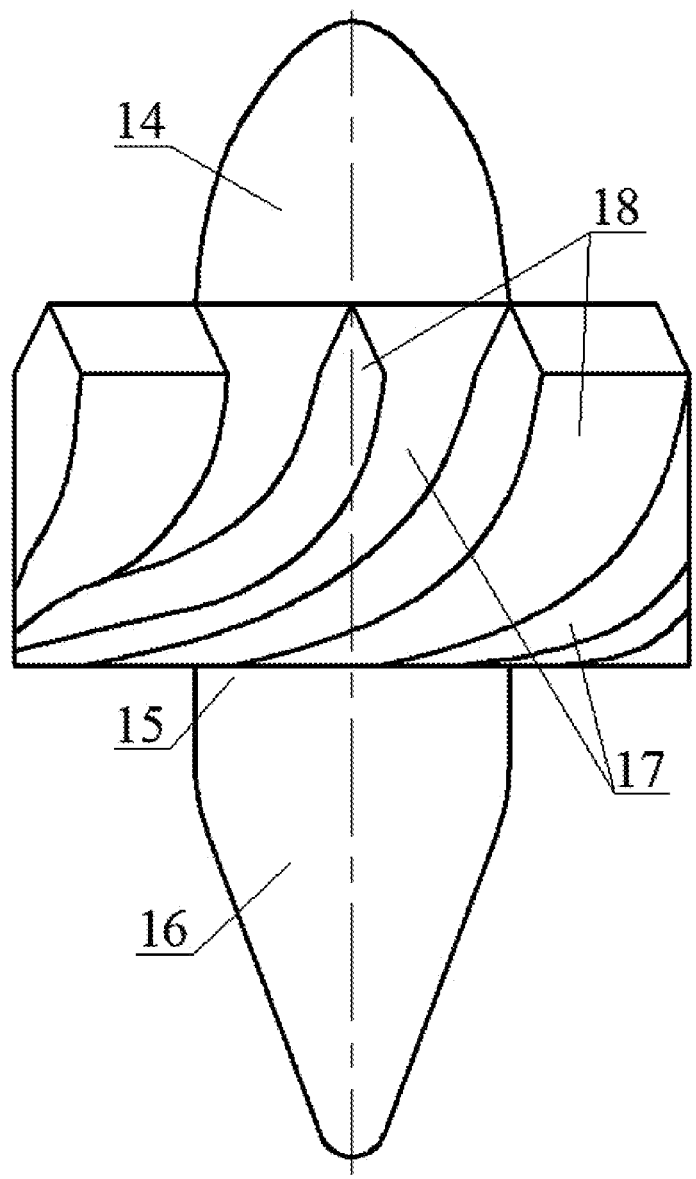
FIG. 4 is a schematic structural diagram of a microbubble spiral gear and a swirling imitated cone body in the microbubble cyclone.

In FIG. 3 and FIG. 4, the microbubble cyclone 2 adjusts the microbubble uniform mixed axial flow into multiple strands of rotational axial flows containing microbubbles by microbubble spiral gear 13 arranged in a squirrel cage arrangement. Screw pitches of spiral lines where tooth traces of microbubble spiral teeth 18 are located and cross-sectional areas of the spiral gear slots 17 perpendicular to the tooth traces of the microbubble spiral teeth 18 need to be adjusted according to the physical property parameters such as the viscosity, the flowing pressure, and the density of the microbubble uniform mixed axial flow. A diameter of a cylindrical surface where an outer tooth surface of the microbubble spiral gear 13 is located and an inner diameter of the swirling pipe body 11 are kept consistent, and a specification design of the diameter of the cylindrical surface needs to consider factors such as the flow rate and the flowing pressure of the microbubble uniform mixed axial flow.

In FIG. 3 and FIG. 4, the uniform mixing pipe body 7 and the axial flow column pipe body 19 of the rotational axial flow degasser 3 are connected with the swirling pipe body 11 into an assembly through flange connections. The microbubble spiral gear 13 is fixed in the lumen of the swirling pipe body 11 in an interference fit. A swirling imitated cone body 12 and the swirling pipe body 11 are coaxially disposed. The swirling imitated cone body 12 includes an ellipsoidal flow leading body 14, a columnar gear body 15, and a conical flow guiding body 16. And the spiral gear slots 17 are formed between the microbubble spiral teeth 18 and are configured as runners for speeding up and changing direction of the microbubble uniform mixed axial flow.

Figure 5:
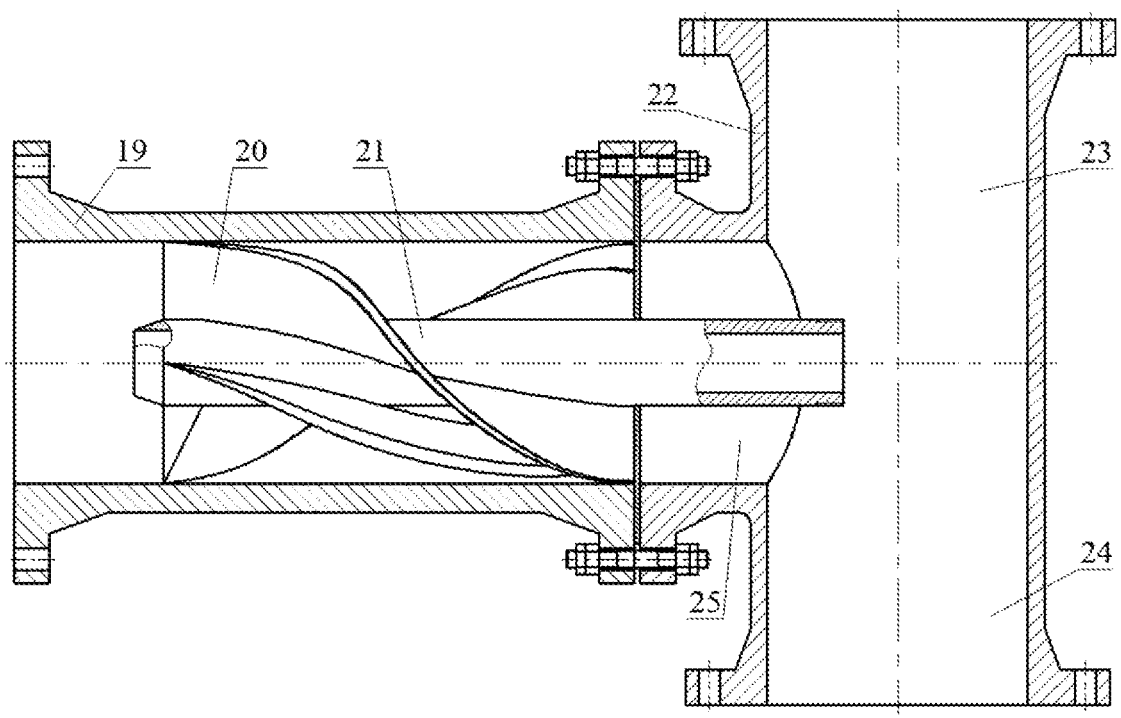
FIG. 5 is a schematic structural diagram of a rotational axial flow degasser in the three-stage tubular T-shaped degassing device with microbubble axial flow and spiral flow fields.
Figure 6:
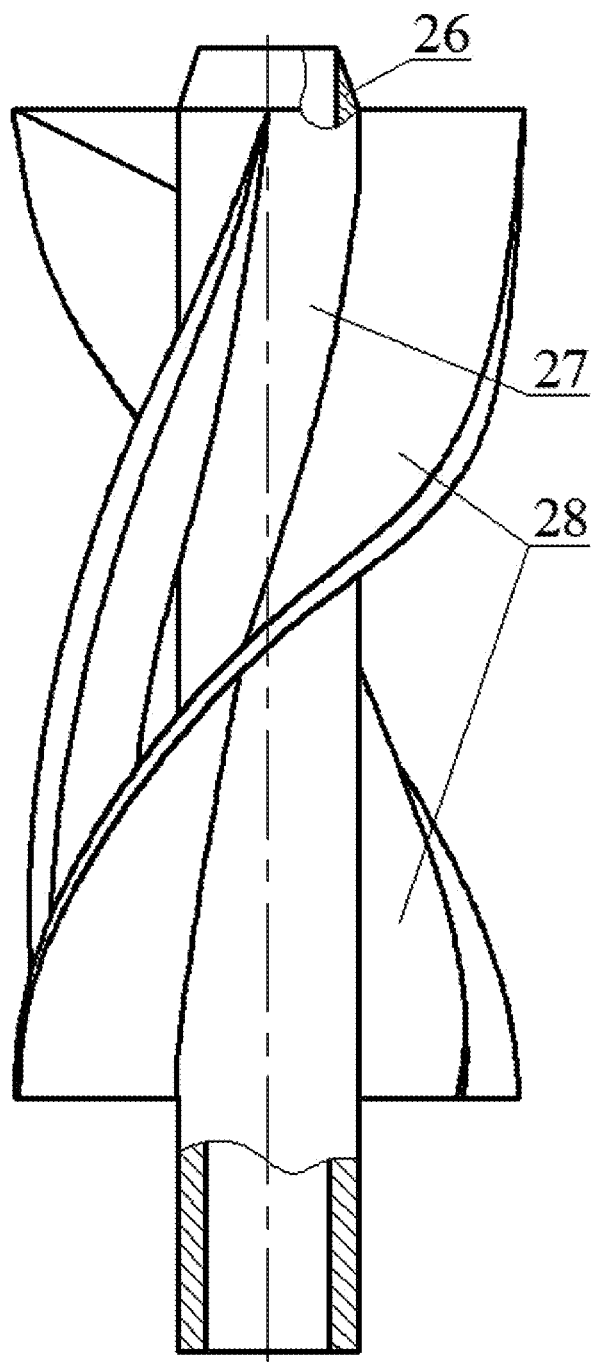
FIG. 6 is a schematic structural diagram of a rotational axial flow impeller and an axial flow exhaust pipe in the rotational axial flow degasser.

In FIG. 5 and FIG. 6, the rotational axial flow degasser 3 removes most microbubbles carried in the gas-liquid two-phase flow to form axial flow gas and axial flow liquid. Flow velocities of the multiple strands of rotational axial flows in the microbubble uniform mixed rotational axial flow field is adjusted according to parameters such as the screw pitches of the spiral lines where the tooth traces of the microbubble spiral teeth 18 are located, the cross-sectional areas of the spiral gear slots 17 perpendicular to the tooth traces of the microbubble spiral teeth 18, and an axial length of an axial flow column pipe body 19. A pipe diameter of the axial flow column pipe body 19 and a pipe diameter of an axial flow horizontal drainage pipe 25 are kept consistent. A number of rotational axial flow blades 28 of the rotational axial flow impeller 20 is adjusted according to the physical property parameters such as the viscosity, the flowing pressure and the density of the axial flow liquid. A flow rate of the axial flow gas is realized by adjusting a pipe diameter of an axial flow exhaust pipe 21. A flow rate of the axial flow liquid is realized by adjusting a pipe diameter of an axial flow drainage three-way pipe 22.

In FIG. 5 and FIG. 6, the axial flow column pipe body 19 is connected with the axial flow horizontal drainage pipe 25 of the axial flow drainage three-way pipe 22 into an assembly through flange connection, and is simultaneously perpendicularly intersected with an axial flow upper vertical drainage pipe 23 and an axial flow lower vertical drainage pipe 24. The rotational axial flow impeller 20 is fixed to the axial flow exhaust pipe 21 through circumferential welding and embedded into a right lumen of the axial flow column pipe body 19 in an interference fit. Rotational axial flow blade slots 27 are formed between rotational axial flow blades 28 and are configured as runners for adjusting a flowing direction of the axial flow liquid, and an axial flow conical groove 26 smoothly guides the axial flow liquid to the rotational axial flow impeller 20.

Figure 7:
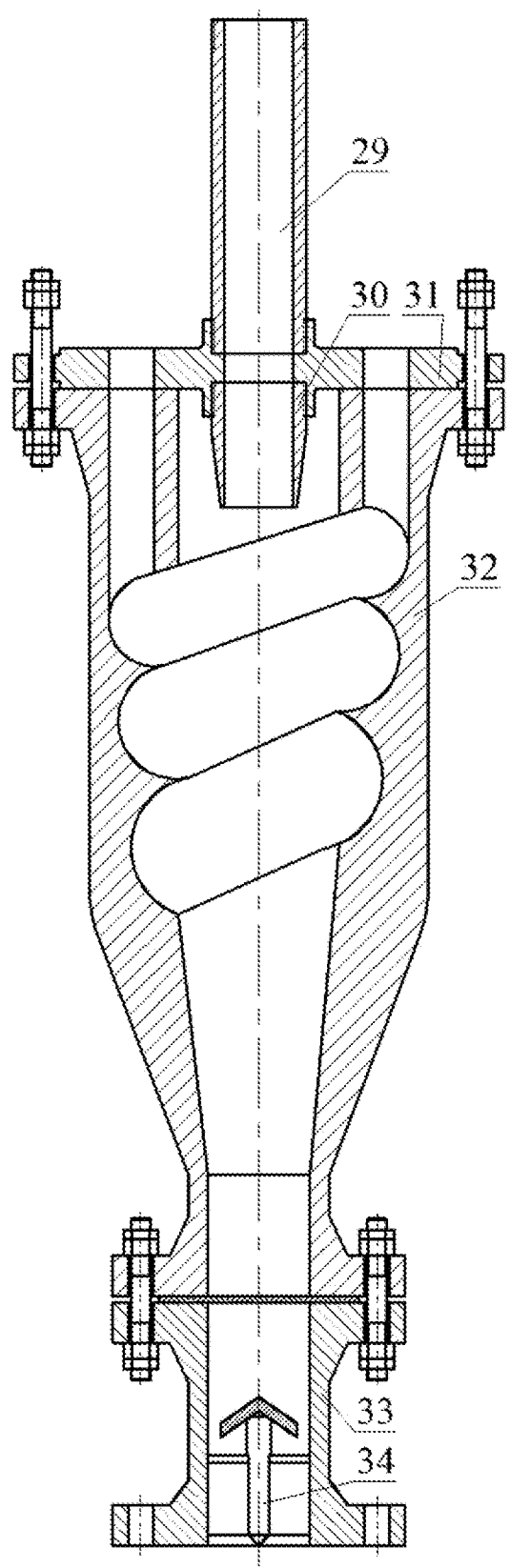
FIG. 7 is a schematic structural diagram of a conical spiral flow degasser of the three-stage tubular T-shaped degassing device with microbubble axial flow and spiral flow fields.
Figure 8:
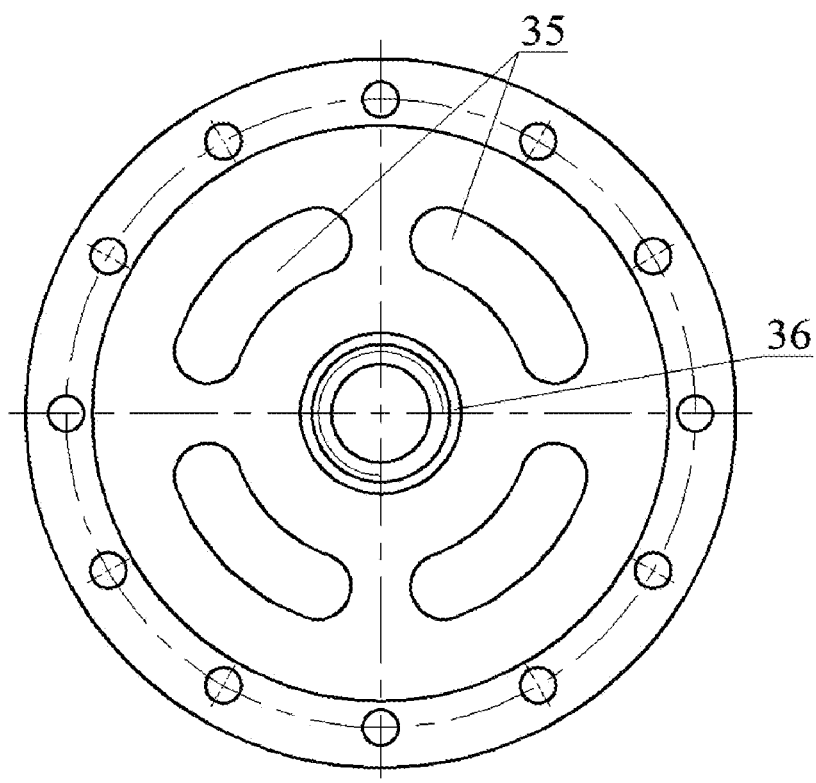
FIG. 8 is a schematic structural diagram of a spiral flow liquid inlet circular plate of the conical spiral flow degasser.
Figure 9:
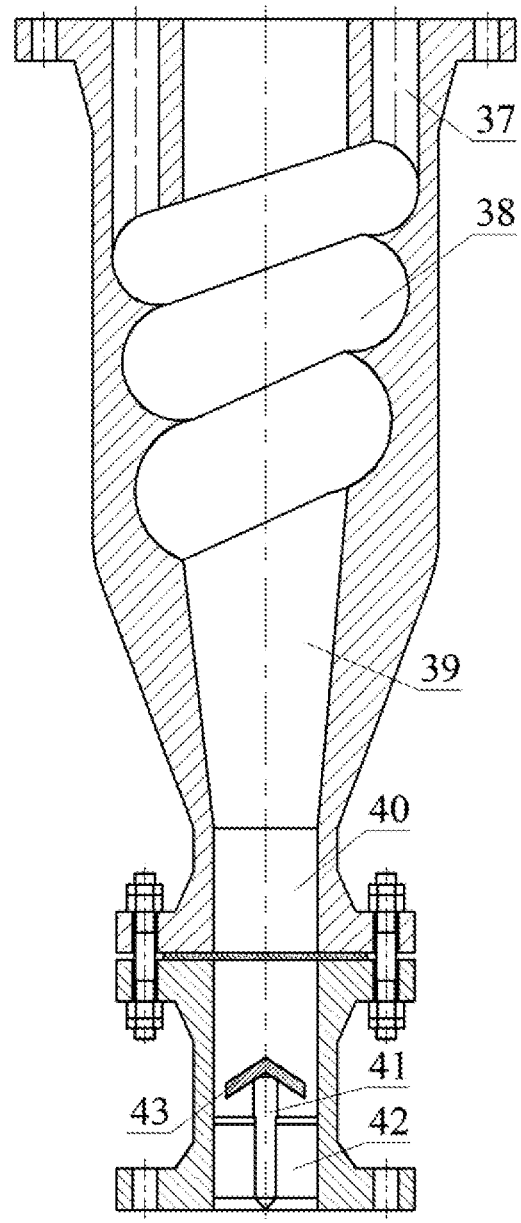
FIG. 9 is a schematic structural diagram of a spiral flow cone pipe body, a spiral flow drainage pipe and a spiral flow impeller in the conical spiral flow degasser.

In FIG. 7 to FIG. 9, the conical spiral flow degasser 4 removes a few of remaining microbubbles carried in the axial flow liquid to form spiral flow gas and spiral flow liquid. A screw pitch change of a spiral runner 38 and an area of a circular surface where a cross section perpendicular to a center line of the spiral runner 38 is adjusted according to the physical property parameters such as the viscosity, the flowing pressure, and the density of the axial flow liquid. A flow velocity of the axial flow liquid in the spiral runner conical spiral flow field is adjusted according to parameters such as a distance from the center point of the circular surface where the cross-section is perpendicular to the center line of the spiral runner 38 is located to the axis of a spiral flow cone pipe body 32, a taper and an axial height of a conical spiral flow runner 39, and a axial height of a columnar spiral flow runner 40. A flow rate of the spiral flow gas is realized by adjusting pipe diameters of a spiral flow exhaust pipe 29 and a spiral flow gas gathering pipe 30. A flow rate of the spiral flow liquid and a gas content of the liquid are realized by adjusting a pipe diameter and an axial height of a spiral flow drainage pipe 33. A taper design of a conical surface where a conical shell of a spiral flow guiding cover 43 is located needs to consider the physical property parameters such as the flow rate, the flowing pressure and the viscosity of the spiral flow liquid.

In FIG. 7 to FIG. 9, the spiral flow cone pipe body 32 is connected with a spiral flow liquid inlet circular plate 31 and the spiral flow drainage pipe 33 into an assembly through flange connection. The spiral flow exhaust pipe 29 and the spiral flow gas gathering pipe 30 are fixed on a lower tubular boss 36 of the spiral flow liquid inlet circular plate 31 through threaded connection. A spiral flow blade 42 and the spiral flow guiding cover 43 are fixed on a spiral flow rod 41 through circumferential welding, and a spiral flow impeller 34 is fixed to the inner pipe wall of the spiral flow drainage pipe 33 in an interference fit. The spiral runner 38, the conical spiral flow runner 39 and the columnar spiral flow runner 40 are milled on an inner pipe wall of the spiral flow cone pipe body 32 in sequence from top to bottom. An arch-shaped liquid transportation slot 35 and the arch-shaped liquid supply slot 37 realize communication between the axial flow drainage three-way pipe 22 and the spiral flow cone pipe body 32.

Figure 10:
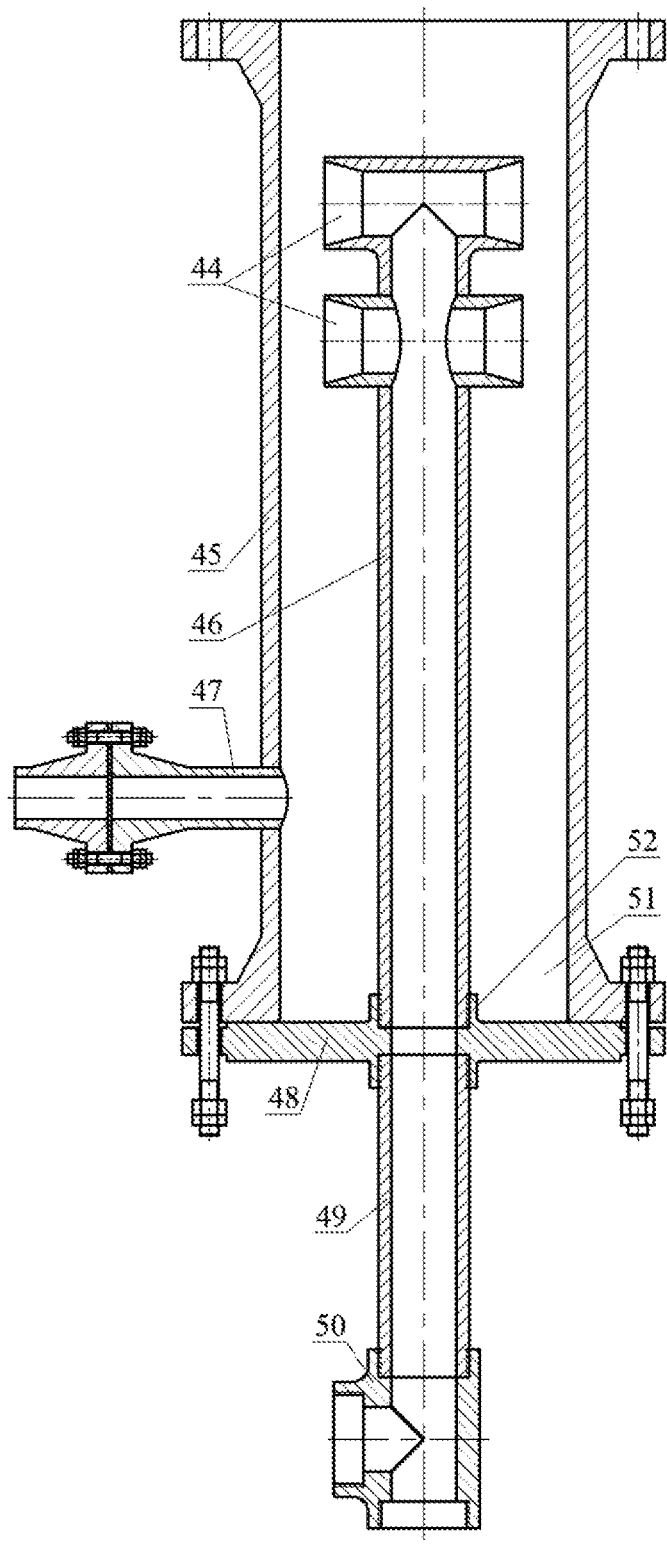
FIG. 10 is a schematic structural diagram of a jet reversing degasser in the three-stage tubular T-shaped degassing device with microbubble axial flow and spiral flow fields.

In FIG. 10, the jet reversing degasser 5 removes small-particle-size liquid droplets carried in the axial flow gas and the spiral flow gas to form reversing gas and reversing liquid. A flow rate of the reversing gas and a liquid content of the gas are realized by adjusting a volume of a vertical double-lumen reversing runner 51 and a type and number of jet nozzles 44. The flow rate of the reversing liquid and the gas content of the liquid are realized by adjusting the volume of the vertical double-lumen reversing runner 51 and an axial length of a gas flow transportation pipe 46. Selection of a pipe diameter of a reversing drainage pipe 47 needs consider factors such as the flow rate and the flowing pressure of the reversing liquid.

In FIG. 10, the axial flow drainage three-way pipe 22 is connected with the axial flow column pipe body 19, the spiral flow cone pipe body 32 and the reversing buffer column pipe body 45 into an assembly through flange connection. The gas flow transportation pipe 46 and a gas flow gathering pipe 49 are fixed to an upper tubular boss 52 of a liquid flow separation disk 48 through threaded connection, and a three-way pipe joint 50 is connected with the axial flow exhaust pipe 21, the gas flow gathering pipe 49 and the spiral flow exhaust pipe 29 into an assembly through threaded connection. All the jet nozzles 44 are fixed on the gas flow transportation pipe 46 by circumferential welding and cause one strand of mixed gas flow to be divided into multiple strands of mixed gas flows. The reversing drainage pipe 47 is fixed on the reversing buffer column pipe body 45 by circumferential welding.

Figure 11:
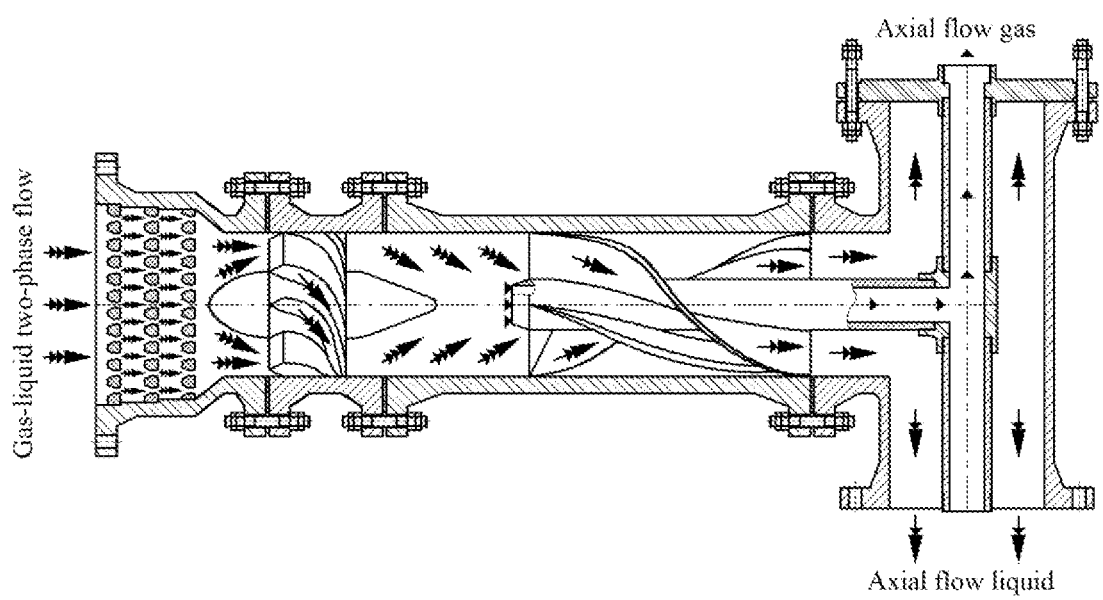
FIG. 11 is a schematic flowchart of a horizontal type microbubble uniform mixed multiple strands rotational axial flow degassing operation by the three-stage tubular T-shaped degassing device with microbubble axial flow and spiral flow fields.

In FIG. 11, a process of the horizontal type microbubble uniform mixed multiple strands rotational axial flow degassing operation is as follows. The gas-liquid two-phase flow enters the uniform mixing pipe body 7. After the gas-liquid two-phase flow flows through a left conical runner of the variable-diameter micropore 10, flowing pressure continuously increases, and a columnar runner of the variable-diameter micropore 10 partitions big bubbles into microbubbles which are then jetted out through a right conical runner of the variable-diameter micropore 10. Therefore, the gas-liquid two-phase flow containing the big bubbles is adjusted into microbubble uniform mixed axial flow by the layered microbubble generation circular plates 6. Next, the microbubble uniform mixed axial flow is led to the microbubble spiral gear 13 arranged in a squirrel cage by the ellipsoidal flow leading body 14 of the swirling imitated cone body 12. The microbubble uniform mixed axial flow in the spiral gear slots 17 between the microbubble spiral teeth 18 is continuously sped up and reversed and is adjusted into multiple strands of rotational axial flows containing the microbubbles. Then, the multiple strands of rotational axial flows are obliquely cut to the right into a lumen of the axial flow column pipe body 19 by the conical flow guiding body 16. A microbubble uniform mixed rotational axial flow field is formed in the axial flow column pipe body 19. The microbubble uniform mixed axial flow in the microbubble uniform mixed rotational axial flow field continuously quickly rotates along the horizontal direction. In a rightwards rotating propulsion process, the liquid phase fluid is gradually thrown to a pipe wall of the axial flow column pipe body 19 to form axial flow liquid. The axial flow liquid enters the rotational axial flow impeller 20 through the axial flow conical groove 26 of the axial flow exhaust pipe 21 and is adjusted into horizontal constant speed axial flow by the rotational axial flow blade slots 27 between the rotational axial flow blades 28. Finally, the axial flow liquid flows through the horizontal double lumen drainage runner between the axial flow horizontal drainage pipe 25 and the axial flow exhaust pipe 21, is buffered by an upper vertical double lumen buffer runner between the axial flow upper vertical drainage pipe 23 and the gas flow gathering pipe 49, and is discharged through a lower vertical double lumen drainage runner between the axial flow lower vertical drainage pipe 24 and the spiral flow exhaust pipe 29. Meanwhile, most microbubbles are gradually transported to a center part of the axial flow column pipe body 19 and are stretched and broken to be gathered into thin long columnar axial flow gas. The axial flow gas is continuously gathered and then discharged via the axial flow exhaust pipe 21.

Figure 12:
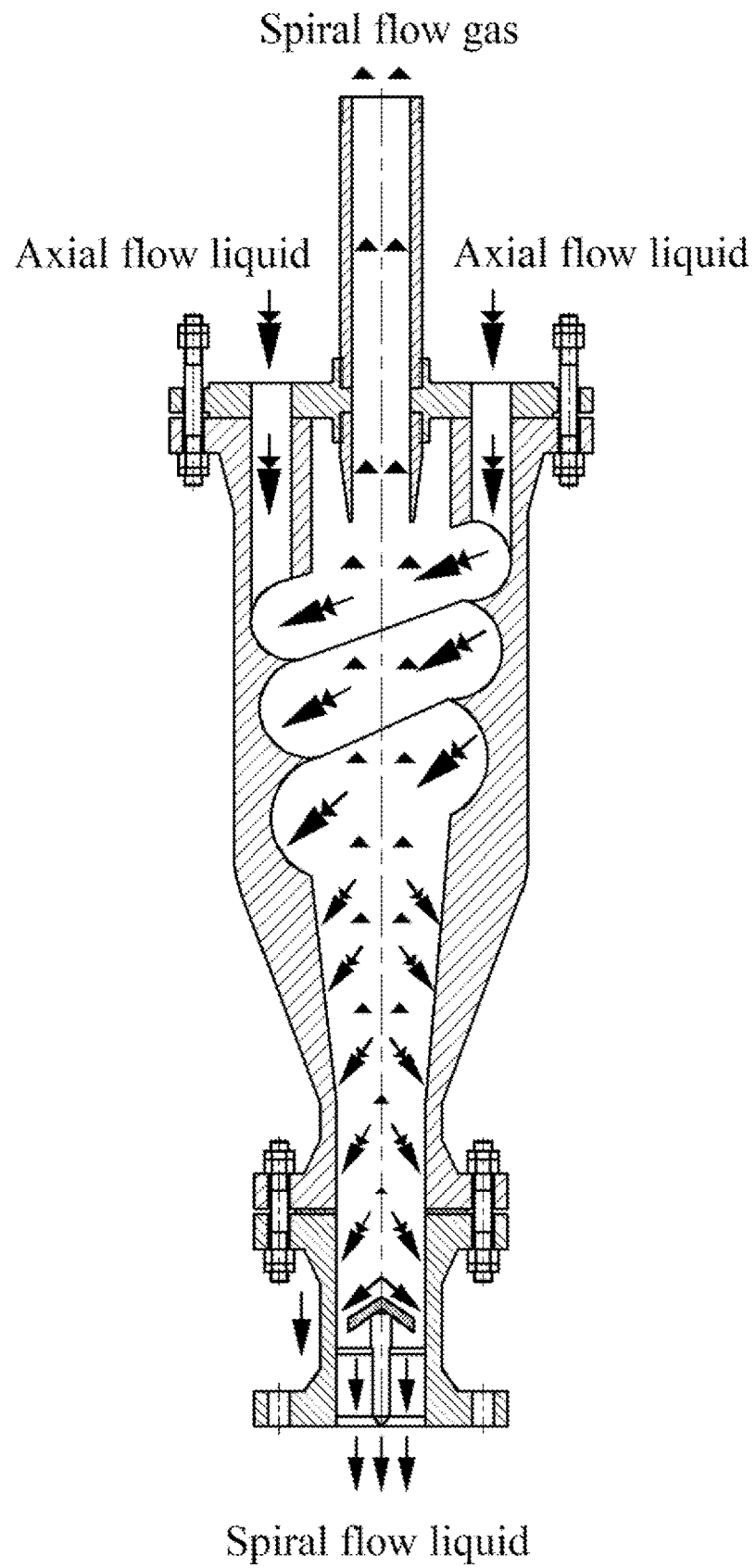
FIG. 12 is a schematic flowchart of a vertical type spiral runner and single-strand conical spiral flow degassing operation by the three-stage tubular T-shaped degassing device with microbubble axial flow and spiral flow fields.

In FIG. 12, a process of the vertical type spiral runner and single-strand conical spiral flow degassing operation is as follows. The axial flow liquid flows into the spiral runner conical spiral flow field through the axial flow lower vertical drainage pipe 24 of the axial flow drainage three-way pipe 22 and through the arch-shaped liquid transportation slot 35 in the spiral flow liquid inlet circular plate 31 and the arch-shaped liquid supply slot 37 of the spiral flow cone pipe body 32. A section of a runner of the spiral runner 38 continuously shrinks, so that the axial flow liquid rotates at high speed to form single-strand conical spiral flow. Then, the single-strand conical spiral flow enters the conical spiral flow runner 39, and an angular momentum increases quickly. Rotating speed of the single-strand conical spiral flow is further increased, and the single-strand conical spiral flow stays in the columnar spiral flow runner 40 for a moment. In a process of rotating downward at a high speed, the liquid phase fluid is gradually thrown to the pipe wall of the spiral flow cone pie body 32 to form the spiral flow liquid which is guided into the spiral flow impeller 34 by the spiral flow guiding cover 43 and is adjusted into a vertical uniform flow by the spiral flow blades 42 on the spiral flow rod 41. Finally, the spiral flow liquid is discharged by the spiral flow drainage pipe 33. Meanwhile, a few of remaining microbubbles are gradually transported to a center part of the spiral flow cone pipe body 32 and are reversely raised and gathered into the spiral flow gas which is caught and continuously gathered by the spiral flow gas gathering pipe 30 and is discharged by the lower tubular boss 36 and the spiral flow exhaust pipe 29 in sequence.

Figure 13:
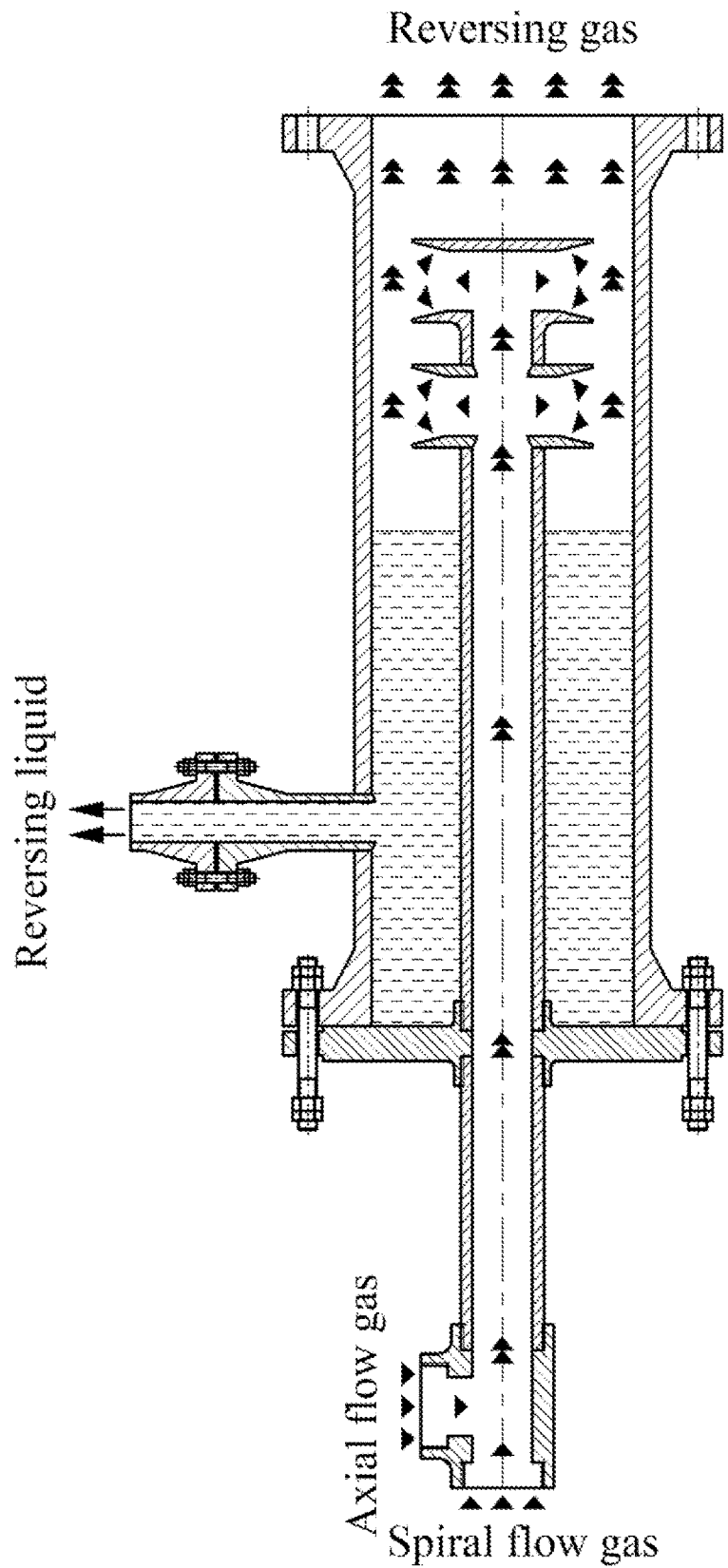
FIG. 13 is a schematic flowchart of a vertical type layered jet collision reversing degassing operation by the three-stage tubular T-shaped degassing device with microbubble axial flow and spiral flow fields.

In FIG. 13, a process of the vertical type layered jet collision reversing degassing operation is as follows. The axial flow gas is transported by the axial flow exhaust pipe 21, and the spiral flow gas is transported by the spiral flow exhaust pipe 29. The axial flow gas and the spiral flow gas are gathered into one strand of mixed gas flow by the three-way pipe joint 50 and the gas flow gathering pipe 49. One strand of the mixed gas flow is transported to the layered jet nozzles 44 through the upper tubular boss 52 and the gas flow transportation pipe 46, and then is divided by the jet nozzles 44 to form multiple strands mixed gas flow. The area of a runner of the multiple strands mixed gas flow in the jet nozzles 44 gradually increases, and the flowing pressure continuously decreases. The multiple strands mixed gas is simultaneously jetted into the reversing buffer column pipe 45. After the reversing, the small particle size liquid droplets carried in the gas flow are removed and separated to form reversing gas and reversing liquid. The separated reversing gas rises up along an inner pipe wall of the reversing buffer column pipe body 45 and is discharged. The reversing liquid falls into the vertical double lumen reversing runner 51 for further buffering and separation and is finally discharged by the reversing drainage pipe 47. And meanwhile, the reversing buffer column pipe body 45 realizes a dynamic balance between the reversing gas flowing pressure and the reversing liquid flowing pressure.

The above embodiments are only used to illustrate the present disclosure, and the structures and connection modes of all components can be changed. Any equivalent transformation and improvement on the basis of the technical solution of the present disclosure shall not be excluded from the protection scope of the present disclosure.

What is claimed is:

1. A three-stage tubular T-shaped degassing device with microbubble axial flow and spiral flow fields, comprising:
    a microbubble uniform mixer, a microbubble cyclone and a rotational axial flow degasser which are coaxially disposed in sequence from left to right and are connected by flanges; wherein the rotational axial flow degasser, a conical spiral flow degasser and a jet reversing degasser are connected with an axial flow drainage three-way pipe into an assembly by flange plates at end parts of three pipe sections of the axial flow drainage three-way pipe; the three-stage tubular T-shaped degassing device is configured to implement: a horizontal degassing operation by uniformly mixing microbubbles and forming multiple strands of rotational axial flow; a vertical degassing operation by passing through a spiral runner and a conical spiral flow runner to form a single-strand conical spiral flow; and a vertical layered jet collision reversing degassing operation;
    the microbubble uniform mixer is configured to convert a gas-liquid two-phase flow containing big bubbles into a microbubble uniform mixed axial flow, and comprises a uniform mixing pipe body and microbubble generation circular plates; the uniform mixing pipe body comprises a combined pipe body formed of a variable-section column pipe and a conical pipe, and comprises a columnar uniform mixing pipe section and a conical gathering and transporting pipe section; the microbubble generation circular plates are coaxially hierarchically arranged at equal intervals in an axial direction of the uniform mixing pipe body and are fixed to a lumen of the uniform mixing pipe body in an interference fit; and the microbubble generation circular plates are provided with variable-diameter micropores in radial directions of the microbubble generation circular plates;
    the microbubble cyclone is configured to convert the microbubble uniform mixed axial flow into multiple strands of rotational axial flows containing microbubbles, and comprises a swirling pipe body, a microbubble spiral gear and a swirling imitated cone body; the uniform mixing pipe body and an axial flow column pipe body are connected with the swirling pipe body into an assembly through a flange connection; the swirling imitated cone body and the swirling pipe body are coaxially disposed, and the swirling imitated cone body comprises an ellipsoidal flow leading body, a columnar gear body and a conical flow guiding body; the microbubble spiral gear comprises microbubble spiral teeth uniformly arranged in a squirrel cage around the columnar gear body; the microbubble spiral gear is fixed to a lumen of the swirling pipe body in an interference fit, and a spiral gear slot is formed between two of the microbubble spiral teeth adjacently located;
    the rotational axial flow degasser is configured to remove most microbubbles carried in the gas-liquid two-phase flow to form axial flow gas and axial flow liquid, and comprises the axial flow column pipe body, a rotational axial flow impeller, the axial flow drainage three-way pipe and an axial flow exhaust pipe; a microbubble uniform mixing rotational axial flow field is formed in the axial flow column pipe body; an axial flow conical groove is milled at a left side end of the axial flow exhaust pipe; the axial flow drainage three-way pipe comprises three connected pipe sections, namely an axial flow horizontal drainage pipe, an axial flow upper vertical drainage pipe and an axial flow lower vertical drainage pipe; a horizontal double-lumen drainage runner is formed between the axial flow horizontal drainage pipe and the axial flow exhaust pipe, an upper vertical double-lumen buffer runner is formed between the axial flow upper vertical drainage pipe and a gas flow gathering pipe; a lower vertical double-lumen drainage runner is formed between the axial flow lower vertical drainage pipe and a spiral flow exhaust pipe; the rotational axial flow impeller comprises rotational axial flow blades uniformly arranged around an outer ring surface of the axial flow exhaust pipe; blade surfaces of the rotational axial flow blades each adopt a combined surface formed of a plane and a curved surface, and a rotational axial flow blade slot is formed between two of the rotational axial flow blades adjacently located;

the conical spiral flow degasser is configured to remove a few of remaining microbubbles carried in the axial flow liquid to form spiral flow gas and spiral flow liquid, and comprises a spiral flow cone pipe body, a spiral flow liquid inlet circular plate, a spiral flow drainage pipe, a spiral flow gas gathering pipe, the spiral flow exhaust pipe, and a spiral flow impeller; arch-shaped liquid supply slots are milled at an upper end of the spiral flow cone pipe body; the spiral runner, a conical spiral flow runner and a columnar spiral flow runner are milled on an inner pipe wall of the spiral flow cone pipe body in sequence from top to bottom; a spiral runner conical spiral flow field is formed in the spiral flow cone pipe body; the spiral runner as a whole is inversely conical, a runner located at a bottom end of the spiral runner is combined with the conical spiral flow runner; an arc-shaped liquid transportation slot is milled on a plate body of the spiral flow liquid inlet circular plate, and a lower tubular boss is arranged at a center part of the spiral flow liquid inlet circular plate; the spiral flow drainage pipe is fixed to a bottom of the spiral flow cone pipe body through flange connection; a spiral flow conical groove is milled at a lower end of the spiral flow gas gathering pipe; the spiral flow impeller is embedded into a lower part of a lumen of the spiral flow drainage pipe, and is formed by welding a spiral flow guiding cover, a spiral flow rod and spiral flow blades in sequence; and the jet reversing degasser is configured to remove small-particle-size liquid droplets carried in the axial flow gas and the spiral flow gas to form reversing gas and reversing liquid, and comprises a liquid flow separation disk, a reversing buffer column pipe body, a gas flow gathering pipe, a gas flow transportation pipe, jet nozzles, a reversing drainage pipe, and a three-way pipe joint; an upper tubular boss is arranged at a center part of the liquid flow separation disk; the axial flow exhaust pipe, the gas flow gathering pipe and the spiral flow exhaust pipe are connected with the three-way pipe joint into an assembly through threaded connection; a circular hole in a lower part of the reversing buffer column pipe body is fixed to the reversing drainage pipe through circumferential welding; a vertical double-lumen reversing runner is formed between the reversing buffer column pipe body and the gas flow transportation pipe; the gas flow gathering pipe gathers the axial flow gas and the spiral flow gas into one strand of mixed gas flow which is divided by the jet nozzles into multiple strands of mixed gas flows; and an upper part of the gas flow transportation pipe is provided with the jet nozzles arranged hierarchically in an axial direction of the gas flow transportation pipe.

2. The three-stage tubular T-shaped degassing device with microbubble axial flow and spiral flow fields according to claim 1, wherein the jet reversing degasser and the conical spiral flow degasser are coaxially disposed from top to bottom; and the rotational axial flow degasser is perpendicularly intersected with the conical spiral flow degasser and the jet reversing degasser, so that the three-stage tubular T-shaped degassing device as a whole is of a T-shaped tubular configuration.

3. The three-stage tubular T-shaped degassing device with microbubble axial flow and spiral flow fields according to claim 1, wherein flange plates are provided at two ends of the uniform mixing pipe body of the microbubble uniform mixer; an inner pipe wall of the columnar uniform mixing pipe section of the uniform mixing pipe body is configured with variable-diameter revolution surfaces; a shaft shoulder is formed at a junction of adjacent variable-diameter revolution surfaces of the columnar uniform mixing pipe section to realize an axial positioning of the microbubble generation circular plates; a diameter of a first small end circular surface of a conical surface where an inner pipe wall of the conical gathering and transporting pipe section of the uniform mixing pipe body is located is equal to an inner diameter of the swirling pipe body, an inner diameter of the axial flow column pipe body and an inner diameter of the axial flow horizontal drainage pipe; and after the microbubble uniform mixed axial flow is momentarily buffered in a lumen of the columnar uniform mixing pipe section, the microbubble uniform mixed axial flow is subjected to continuous pressure adjustment by the conical gathering and transporting pipe section and is gathered and transported to the swirling pipe body; and the microbubble generation circular plates of the microbubble uniform mixer adopt super duplex stainless steel plates with a same thickness; outer ring surfaces of the microbubble generation circular plates are in an interference fit with a cylindrical surface where the variable-diameter revolution surfaces of the columnar uniform mixing pipe section are located; the variable-diameter micropores in one plate of the microbubble generation circular plates and the variable-diameter micropores in another plate of the microbubble generation circular plates adjacent to the one plate are arranged in an staggered manner, the variable-diameter micropores of each microbubble generation circular plate are uniformly distributed in a circumferential direction of the microbubble generation circular plate; each of the variable-diameter micropores comprises a left conical runner, a right conical runner and one columnar runner in the axial direction of the uniform mixing pipe body, and a cone height of a conical surface where a left conical runner of the variable-diameter micropore is located is greater than a cone height of a conical surface where a right conical runner is located.

4. The three-stage tubular T-shaped degassing device with microbubble axial flow and spiral flow fields according to claim 1, wherein the swirling pipe body of the microbubble cyclone adopts a horizontal equal-diameter short pipe; the ellipsoidal flow leading body of the swirling imitated cone body is configured with a hemi-ellipsoidal surface, and is configured to smoothly lead the microbubble uniform mixed axial flow to spiral gear slots; the columnar gear body is configured with a cylindrical surface and is uniformly welded with the microbubble spiral gears in a circumferential direction of the columnar gear body; and the conical flow guiding body is configured with a conical surface and is configured to smoothly guide the multiple strands of rotational axial flows to the lumen of the axial flow column pipe body; and tooth traces of the microbubble spiral teeth in the microbubble spiral gear are spiral lines spread along a cylindrical surface where the columnar gear body is located, and screw pitches of spiral lines where the tooth traces of the microbubble spiral teeth are located, gradually increase along an axial direction of the swirling imitated cone body; cross-sections of the microbubble spiral teeth perpendicular to the tooth traces of the microbubble spiral teeth is trapezoid; tangent lines at start points of the tooth traces of the microbubble spiral teeth is parallel to an axial line of the swirling imitated cone body, and tangent lines at end points of the tooth traces are obliquely interlaced with the axial line of the swirling imitated cone body; outer tooth surfaces of the microbubble spiral gears in a radial direction of the swirling imitated cone body are configured as a cylindrical surfaces, and a cylindrical surface where the outer tooth surfaces of the microbubble spiral gears are located is in an interference fit with an inner pipe wall of the swirling pipe body; the spiral gear slots between the microbubble spiral teeth are configured as runners for speeding up and changing a direction of the microbubble uniform mixed axial flow; and areas of cross-sections of the spiral gear slots perpendicular to the tooth traces of the microbubble spiral teeth continuously decrease in the axial direction of the swirling imitated cone body.

5. The three-stage tubular T-shaped degassing device microbubble axial flow and spiral flow fields according to claim 1, wherein the rotational axial flow degasser implements the horizontal degassing operation; the axial flow column pipe body adopts a horizontal equal-diameter thick long pipe; the axial flow exhaust pipe adopts a horizontal equal-diameter thin long pipe and is configured as a gathering and discharging runner for the axial flow gas; the axial flow conical groove at a left side end of the axial flow exhaust pipe is configures to smoothly guide the axial flow liquid to the rotational axial flow impeller; the axial flow drainage three-way pipe adopts a three-way thick pipe, the end parts of three pipe sections of which are respectively provided with flange plates, and the axial flow column pipe body, the spiral flow cone pipe body and the reversing buffer column pipe body are connected with the axial flow drainage three-way pipe into an assembly through flange connection; the axial flow upper vertical drainage pipe and the axial flow lower vertical drainage pipe of the axial flow drainage three-way pipe have equal inner diameters and are vertically intersected with the axial flow horizontal drainage pipe; the axial flow horizontal drainage pipe and the axial flow exhaust pipe are coaxially disposed; the axial flow upper vertical drainage pipe and the gas flow gathering pipe are coaxially disposed; and the axial flow lower vertical drainage pipe and the spiral flow exhaust pipe are coaxially disposed.

6. The three-stage tubular T-shaped degassing device with microbubble axial flow and spiral flow fields according to claim 1, wherein a left side and a right side of the blade surfaces of the rotational axial flow blades of the rotational axial flow impeller are planes; planes where the left side surfaces and the right side surfaces of the blade surfaces of the rotational axial flow blades are located are kept parallel to the axis of the axial flow exhaust pipe; an inner side of the rotational axial flow impeller in a radial direction of the axial flow column pipe body is fixed on the axial flow exhaust pipe through circumferential welding; and an outer side of the axial flow column pipe body is embedded into a right lumen of the axial flow column pipe body in an interference fit; and rotational axial flow blade slots between the rotational axial flow blades are configured as runners for adjusting a flowing direction of the axial flow liquid.

7. The three-stage tubular T-shaped degassing device with microbubble axial flow and spiral flow fields according to claim 1, wherein the conical spiral flow degasser implements the vertical degassing operation; the spiral flow cone pipe body adopts a vertical variable-diameter thick-wall thick pipe; the arch-shaped liquid supply slots are uniformly distributed in a circumferential direction of the spiral flow cone pipe body; an inner slot surface and an outer slot surface of each arch-shaped liquid supply slot in a radial direction of the spiral flow cone pipe body adopt circular arch surfaces with different diameters, and slot surfaces at two sides of the arch-shaped liquid supply slot in a circumferential direction of the spiral flow cone pipe body adopt semi-cylindrical surfaces; a diameter of the circular arch surface, where the outer slot surface of the arch-shaped liquid supply slot in the radial direction of the spiral flow cone pipe body is located, is equal to an inner diameter of the axial flow upper vertical drainage pipe, an inner diameter of the axial flow lower vertical drainage pipe, and an inner diameter of the reversing buffer column pipe body; and axial heights of the spiral runner, the conical spiral flow runner and the columnar spiral flow runner in the spiral flow cone pipe body decrease in sequence; a center line connecting center points of all cross-sections of the spiral runner adopts a variable-pitch spiral line; the cross-sections of the spiral runner perpendicular to the center line are semicircular surfaces, and areas of circular surfaces where the cross-sections perpendicular to the center line of the spiral runner are located, gradually increase from top to bottom, and distances from the center points of the circular surfaces where the cross-sections are located to an axis of the spiral flow cone pipe body continuously decreases from top to bottom; a runner located at a top end of the spiral runner is kept communication with the arch-shaped liquid supply slots; and a diameter of a second small end circular surface of a conical surface where the pipeline wall of the conical spiral flow runner is located is equal to a diameter of a cylindrical surface where the pipeline wall of the columnar spiral flow runner is located.

8. The three-stage tubular T-shaped degassing device with microbubble axial flow and spiral flow fields according to claim 1, wherein the spiral flow liquid inlet circular plate adopts a circular steel plate, and an arc-shaped liquid transportation slots realize communication between the arch-shaped liquid supply slots of the spiral flow cone pipe body and the axial flow drainage three-way pipe; cross-sections of the arch-shaped liquid transportation slots and the arc-shaped liquid supply slots are kept consistent in shape and size; and the spiral flow liquid inlet circular plate connects the spiral flow gas gathering pipe with the spiral flow exhaust pipe into an assembly through threaded connection;

the spiral flow drainage pipe adopts a vertical equal-diameter thick short pipe, and the spiral flow gas gathering pipe and the spiral flow exhaust pipe respectively adopt a vertical equal-diameter thin short pipe and a thin long pipe; and the spiral flow gas gathering pipe, the spiral flow exhaust pipe, the gas flow gathering pipe, and the gas flow transportation pipe are coaxially arranged in sequence from bottom to top, and have a same inner diameter; and the spiral flow guiding cover of the spiral flow impeller adopts a center-closed conical shell and is configured to guide the spiral flow liquid that rotates at a high speed into each of the spiral flow blades which adopts a flat-plate blade, and is uniformly disposed around an outer ring surface of the spiral flow rod; an inner side of each of the spiral flow blades in a radial direction of the spiral flow rod is fixed to the spiral flow rod through circumferential welding, and an outer side of each of the spiral flow blades is fixed to an inner pipe wall of the spiral flow drainage pipe in an interference fit.

9. The three-stage tubular T-shaped degassing device microbubble axial flow and spiral flow fields according to claim 1, wherein the jet reversing degasser implements the vertical layered jet collision reversing degassing operation, and a dynamic balance between a reversing gas flow pressure and a reversing liquid flow pressure is realized through the reversing buffer column pipe body; the liquid flow separation disk adopts a circular steel plate, and connects the gas flow gathering pipe with the gas flow transportation pipe into an assembly through threaded connection; the three-way pipe joint adopts a three-way pipe body; the reversing buffer column pipe body adopts a vertical equal-diameter thick long pipe, and the circular hole is drilled in a lower part of a pipe body of the reversing buffer column pipe body; the reversing drainage pipe adopts a equal-diameter thin long pipe and is disposed horizontally; the reversing buffer column pipe body and the gas flow transportation pipe are coaxially disposed; and a sum of a pressure of the reversing gas above the lumen of the reversing buffer column pipe body and a liquid column pressure of the reversing liquid in the vertical double-lumen reversing runner is equal to a flowing pressure of the reversing liquid in the reversing drainage pipe.

10. The three-stage tubular T-shaped degassing device microbubble axial flow and spiral flow fields according to claim 1, wherein the gas flow gathering pipe and the gas flow transportation pipe of the jet reversing degasser respectively adopt a vertical equal-diameter thin short pipe and a thin long pipe; jet nozzles in each layer at an upper part of the gas flow transportation pipe are horizontally disposed and are uniformly distributed in a circumferential direction of the gas flow transportation pipe; each of the jet nozzles is fixed on a pipe body of the gas flow transportation pipe through circumferential welding; an outer wall of each of the jet nozzles adopts a cylindrical surface, and an inner wall of each of the jet nozzles is formed by combining a cylindrical surface and a conical surface; the cylindrical surface and the conical surface of the inner wall of each of the jet nozzles are disposed in a radial direction of the gas flow transportation pipe from inside to outside; so that runner areas of the multiple strands of mixed gas flows in the jet nozzles gradually increase, and flowing pressures of the multiple strands of mixed gas flows continuously decrease.

* * * * *